June 23, 1953  K. M. FEIERTAG  2,643,351
DYNAMOELECTRIC MACHINE
Filed June 5, 1952
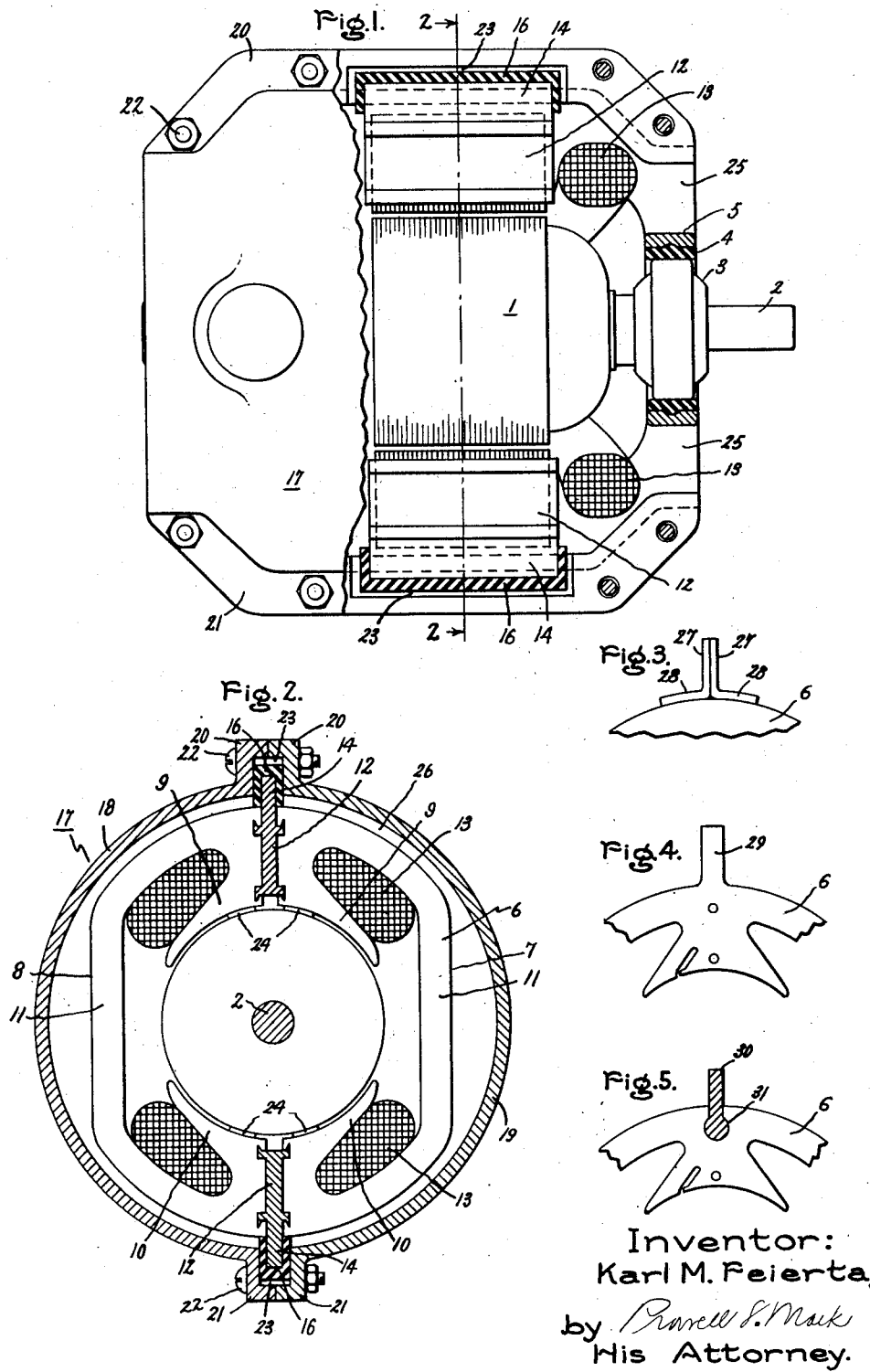
Inventor:
Karl M. Feiertag,
by *Travell S. Mack*
His Attorney.

Patented June 23, 1953

2,643,351

UNITED STATES PATENT OFFICE 2,643,351

DYNAMOELECTRIC MACHINE

Karl M. Feiertag, Fort Wayne, Ind., assignor to General Electric Company, a corporation of New York Application June 5, 1952, Serial No. 291,951

6 Claims. (Cl. 310—258)

This invention relates to dynamoelectric machines, and more particularly to the mounting of the stator member of such machines within a frame or shell assembly.

In the design of certain dynamoelectric machines, particularly fractional-horsepower motors, it is desirable to provide means for absorbing the torsional vibration so that such vibration is not transmitted to the machine of which the motor forms a part. In the past, this torsional vibration has been isolated by means of resilient mountings engaging the exterior parts of the motor, for example as shown in Patent 2,074,136, Welch, assigned to the assignee of this invention. Arrangements of this type, while functionally satisfactory, necessitate the use of a separate base and resilient rings interposed between the base and the bearing hubs of the motor, thus adding to the overall size and cost of the motor. It is therefore desirable to provide a motor construction wherein the stator core is resiliently mounted within the motor frame or shell so that all vibration dampening takes place within the motor, thus eliminating the necessity for external resilient mounting arrangements.

Another feature which contributes to the cost of fractional horsepower motors is the provision of a cylindrical outer shell frame member. This member has conventionally been formed by rolling-up a suitable strip of steel and welding the ends, with a subsequent grinding operation being necessary to smooth the welded joint. End shields carrying the bearings complete the assembly thus requiring that fans or other devices carried on the motor shaft extension be assembled on the shaft after the rotor is positioned in the stator. It is thus further desirable to provide an outer frame or shell formed in symmetrical halves, thus permitting the bearings to be directly mounted in the shell. This construction permits the use of die castings without further machining. It will be readily seen that with such an arrangement, a rotor may be dynamically balanced with fans or other driven elements mounted on the shaft extension, and the rotor may be subsequently installed in the stator without the necessity for disassembling the elements from the shaft.

In present machines, the shell or frame is frequently shrunk over the stator core, thus rendering subsequent removal of the stator core for rewinding extremely difficult. In the event that ventilation of the outer surface of the core is desirable, spacing members are ordinarily provided, thus adding an additional element of cost. It is therefore additionally desirable that a convenient arrangement be provided for mounting the stator core within the frame, which permits ready removal of the core when desired, and further that such a mounting provide ventilating passages over the core without the provision of additional spacing members.

It is therefore an object of this invention to provide an improved dynamoelectric machine construction incorporating the various desirable features recited above.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects provides a stator core member having an outwardly extending projection formed on its outer periphery and a shell member longitudinally divided into at least two symmetrical sections, each of the sections having an outwardly extending flange formed along a longitudinal edge. The stator core member is arranged within the shell member with its projection being positioned between the flanges of the shell sections, and means are arranged to clamp the sections together so that the flanges tightly engage the core member projection, thereby to support the core member. In order to provide for resiliently mounting the stator core member within the shell to absorb torsional vibration, a resilient sleeve member may be positioned on the stator core projection so that the shell member flanges respectively engage the sides of the resilient member. In addition, the outer surface of the stator core member may be spaced from the shell member while still being held in place and supported by the engagement of the shell member flanges with the stator core projection, so that ventilating passages are provided over the stator core.

In the drawing,

Fig. 1 is a broken-away view, partly in section, showing the improved dynamoelectric machine construction of this invention;

Fig. 2 is a cross-sectional view taken along the line 2—2 of Fig. 1; and

Figs. 3, 4 and 5 show alternative forms of stator core member projections.

Referring now to Figs. 1 and 2, there is shown a typical dynamoelectric machine, for example, a series fractional-horsepower motor utilizing the improved stator core member mounting of this invention. This machine is provided with a suitable rotor or armature member 1 mounted on a shaft 2. The shaft 2 is rotatably supported by suitable anti-friction bearings 3 (only one of which is shown) which in turn are surrounded by cushion rings 4 formed of suitable resilient material, such as rubber or neoprene. Each cushion ring 4 is in turn mounted within a bearing housing 5 which is formed integral with the shell member sections to be hereinafter described. The armature 1 is surrounded by a stator core 6 formed of a plurality of relatively thin laminations. In Figs. 1 and 2, the stator core member 6 is shown as being formed of a pair of identical sections 7 and 8, each having pole halves 9 and 10 joined by yoke portions 11. The two halves 7 and 8 are held together by suitable locking wedges 12 formed of non-magnetic material, either driven into place or cast in place. Suitable field windings 13 are arranged around poles 9 and 10 to complete the stator assembly. It is thus seen that a magnetically split stator core construction is provided which furnishes the well-known superior performance in a series commutator type motor by virtue of the improvement in commutation resulting from the reduction in the effect of armature reaction.

In order to mount the stator core member 6 within an outer shell or frame, the wedge members 12 are respectively provided with outwardly extending fins 14 extending beyond the outer periphery 15 of the stator core member 6. The fins 14 are in turn surrounded by suitable resilient sleeves or cushions 16 formed of suitable resilient material such as rubber or neoprene. An outer shell or frame member 17 is provided, longitudinally divided into a pair of identical halves or sections 18 and 19. Each shell section is provided with a pair of flanges 20 and 21 formed along its longitudinal edges, these flanges extending outwardly away from the stator core member 6. It will be readily seen that the stator core member 6 is arranged within the shell member 17 with the fins 14 and sleeves 16 arranged thereon being positioned between the flanges 20 and 21. In order to hold the assembly together, clamping screws 22 extend through the flanges 20 and 21, thus clamping the flanges together, thereby tightly to engage the fins 14 and resilient sleeves 16. It is thus seen that the shell halves 18 and 19 are held together and the stator core member 6 is supported within the shell 17 by engagement of the flanges 20 and 21 with the fins 14 and resilient sleeves 16.

In order to assemble the motor of Figs. 1 and 2, resilient sleeves or cushions 16 are positioned on the fins 14 of wedge members 12 and the armature 1 is then placed in the bore of stator core member 6. This assembly is then placed in one of the two shell sections, for example, the shell section 18. It will be noted here that the cavities 23 defined by the flanges 20 and 21 are slightly radially deeper than the height of the cushions 16 and also slightly longer axially than the cushions 16, thus permitting adjustment of the stator core member 6 both parallel and perpendicular to the axis of the armature 1. In order to insure concentricity, the stator core member 6 is centered with the rotor 1 in place by means of suitable gage strips 24 which are subsequently withdrawn after the assembly is complete. After the centering operation has been accomplished, the remaining shell half 19 is arranged over the stator core and fastened to shell half 18 by means of clamp screws 22. The gage strips 24 are then withdrawn through the ventilating openings 25 at the ends of the machine.

It will now be readily seen that this construction accommodates all vibration dampening within the motor case, since the rotor vibrations are absorbed by cushions 4 in which the bearings 3 are mounted, while sleeves 16 absorb the stator vibration. It will be readily apparent that the degree of vibration absorption may be controlled by varying the thickness or relative hardness of the cushions 16. In the event that resilient mounting is not necessary, the cushions 16 may be eliminated and the fins 14 directly engaged by the flanges 20 and 21. It will also be seen that this construction permits the use of symmetrical shell halves which may be die castings which do not require further machining. In addition, the stator core member 6 can be readily spaced from the outer shell member 17 so that the outer surfaces 15 define ventilating passages 26 with the shell member 17. This construction further permits the armature 1 to be dynamically balanced with elements, such as a fan, already mounted on the shaft 2, so that the rotor with this assembled equipment may be installed in the stator without the necessity for disassembling such equipment.

While this invention has heretofore been described in connection with a series motor, it will be readily apparent that it is equally applicable to other types of motors, for example a single phase alternating current shaded pole motor. Referring now to Fig. 3, it is seen that the outwardly extending mounting fins may be formed of a pair of abutting angle members 27, spot, seam, or otherwise welded together, and with their flanges 28 further welded to the stator core. Referring now to Fig. 4, it will be seen that the outwardly and longitudinally extending fin 29 may be integrally formed as part of the stator punchings. In Fig. 5, the fin 30 is fabricated separately and driven into a slot 31 in the outer periphery of the stator core 6, or may in the alternative be cast in place.

It is now seen that this invention provides an improved dynamoelectric machine construction wherein the stator core is resiliently mounted within the shell, this mounting permitting the use of symmetrical shell sections. In addition, this construction permits ready removal of the stator core from the shell, and provides a ventilating passage over the stator core member.

While I have shown and described preferred embodiments of this invention, further modifications and improvements will occur to those skilled in the art. I desire it to be understood therefore that this invention is not limited to the exact forms shown, and I intend in the appended claims to cover all modifications which do not depart from the spirit and scope of this invention.

What I claim as new and desire to secure by Letters Patent of the United States is:

1. In a dynamoelectric machine, a stator core member having an outwardly extending projection formed on its outer periphery, resilient means respectively arranged on the sides of said projection, a shell member longitudinally divided into at least two symmetrical sections, each of said sections having an outwardly extending flange portion formed along a longitudinal edge thereof, said stator core member being arranged within said shell member with said projection and said resilient means being positioned between said flanges, and means arranged to clamp said shell member sections together whereby said flanges tightly engage said resilient means and said core member projection thereby resiliently to support said stator core member.

2. In a dynamoelectric machine, a stator core member having a pair of diametrically oppositely disposed outwardly extending projections formed on its outer periphery, resilient means respectively arranged on the sides of said projections, a shell member longitudinally divided into two symmetrical sections, each of said sections having outwardly extending flange portions respectively formed along its longitudinal edges, said stator core member being arranged within said shell member with said projections and said resilient means being respectively positioned between mating pairs of said flanges, and means arranged to clamp said shell member sections together whereby said flanges tightly engage said resilient means and said core member projections, thereby resiliently to support said stator core member.

3. In a dynamoelectric machine, a stator core member having a pair of diametrically oppositely disposed outwardly extending fin members secured to its outer periphery, resilient means respectively arranged on the sides of said fin members, a shell member longitudinally divided into two symmetrical sections, each of said sections having outwardly extending flange portions respectively formed along its longitudinal edges, said stator core member being arranged within said shell member with said fins and said resilient means being respectively positioned between mating pairs of said flanges, and means arranged to clamp said shell member sections together whereby said flanges tightly engage said resilient means and said core member fins thereby resiliently to support said stator core member.

4. In a dynamoelectric machine, a stator core member longitudinally divided into two symmetrical sections, a pair of non-magnetic members respectively arranged between and engaging mating longitudinal edges of said core member sections, each of said non-magnetic members having a portion extending outwardly beyond the outer periphery of said core member respectively forming longitudinally extending fin members, a shell member longitudinally divided into two symmetrical sections, each of said shell member sections having outwardly extending flange portions respectively formed along its longitudinal edges, said stator core member being positioned within said shell member with said fins being respectively positioned between mating pairs of said flanges, and means arranged to clamp said shell member sections together whereby said flanges tightly engage said core member fins thereby to support said stator core member.

5. In a dynamoelectric machine, a stator core member longitudinally divided into two symmetrical sections, a pair of non-magnetic members respectively arranged between and engaging mating longitudinal edges of said core member sections, each of said non-magnetic members having a portion extending outwardly beyond the outer periphery of said core member respectively forming longitudinally extending fin members, resilient means respectively arranged on the sides of said fin members, a shell member longitudinally divided into two symmetrical sections, each of said sections having outwardly extending flange portions respectively formed along its longitudinal edges, said stator core member being arranged within said shell member with said fins and said resilient means being respectively positioned between mating pairs of said flanges, and means arranged to clamp said shell member sections together whereby said flanges tightly engage said resilient means and said core member fins thereby resiliently to support said stator core member.

6. In a dynamoelectric machine, a stator core member having a pair of diametrically oppositely disposed outwardly extending projections formed on its outer periphery, a sleeve of resilient material mounted on each of said projections, a shell member longitudinally divided into two symmetrical sections, each of said sections having outwardly extending flange portions respectively formed along its longitudinal edge, said flange portions extending outwardly from said shell member sections, said stator core member being arranged within said shell member and spaced therefrom with said projections and said resilient sleeves being respectively positioned between mating pairs of said flanges, and means arranged to clamp said shell member sections together whereby said flanges tightly engage said resilient sleeves and said core member projections thereby resiliently to support said stator core member.

KARL M. FEIERTAG.

References Cited in the file of this patent

UNITED STATES PATENTS

| Number | Name | Date |
|---|---|---|
| 2,461,296 | Ordas | Feb. 8, 1949 |

FOREIGN PATENTS

| Number | Country | Date |
|---|---|---|
| 158,865 | Great Britain | Jan. 2, 1922 |
| 611,507 | Germany | Mar. 28, 1935 |
| 619,353 | Germany | Sept. 28, 1935 |